United States Patent [19]

Phillips et al.

[11] Patent Number: 4,748,663
[45] Date of Patent: May 31, 1988

[54] LOUDSPEAKING TELEPHONE INSTRUMENT

[75] Inventors: Ian Phillips, Sherston; Lawrence J. Hibberd, Chippenham; Leslie H. Williams, Swindon, all of England

[73] Assignee: U.S. Philips Corp., New York, N.Y.

[21] Appl. No.: 42,543

[22] Filed: Apr. 22, 1987

Related U.S. Application Data

[63] Continuation of Ser. No. 714,597, Mar. 21, 1985, abandoned.

[30] Foreign Application Priority Data

Mar. 21, 1984 [GB] United Kingdom ............... 8407361

[51] Int. Cl.$^4$ ............................................ H04M 1/00
[52] U.S. Cl. ................................. 379/388; 379/406
[58] Field of Search ............... 379/387, 388, 389, 390, 379/399, 406, 407, 408, 409

[56] References Cited

U.S. PATENT DOCUMENTS

| 3,022,504 | 2/1962 | Stroud et al. ............... 379/406 X |
| 3,567,873 | 3/1971 | Peroni ............................. 379/406 |
| 3,585,311 | 6/1971 | Berkley et al. ................. 379/406 |
| 3,622,714 | 11/1971 | Berkley et al. ................. 379/399 |
| 4,456,792 | 6/1984 | Courtney-Pratt ............... 379/202 |

FOREIGN PATENT DOCUMENTS 1023285  3/1953  France.

Primary Examiner—Jin F. Ng
Assistant Examiner—R. Vaas
Attorney, Agent, or Firm—Thomas A. Briody; Jack Oisher

[57] ABSTRACT

A loudspeaking telephone instrument comprises a transmit path comprising a microphone (1) and comb filter (2); a receive path comprising a comb filter (3), a frequency shifter (4) and a loudspeaker (5); and a hybrid circuit (6). The frequency shifter (4) shifts the frequency of a signal applied to its input by a fixed amount and the comb filters (2,3) are arranged so that the frequency shifted signal falls in their stop bands. This increases the available gain in the loudspeaking telephone instrument before instability occurs. The spacings of the pass and stop bands of the comb filters (2,3) are at a multiple of the frequency by which the frequency shifter shifts that of its input signal.

4 Claims, 1 Drawing Sheet

LOUDSPEAKING TELEPHONE INSTRUMENT

This is a continuation of application Ser. No. 714,597, filed Mar. 21, 1985, now abandoned.

BACKGROUND OF THE INVENTION

1. Field of the Invention

The invention relates to a loudspeaking telephone instrument comprising a transmit path including a microphone and a receive path including a loudspeaker, the transmit or receive path further including a frequency shifter capable of shifting the frequency of an electrical signal applied to its input by a given amount.

2. Description of the Related Art

The purpose of a loudspeaking telephone instrument is to allow hands free communication, i.e. to dispense with the telephone handset by substituting for it a microphone and loudspeaker, normally mounted within the instrument casing. Thus the user can communicate without being in physical contact with the telephone instrument giving the advantage of greater flexibility, for example in referring to documents. The main problem which faces the designer of loudspeaking telephones is to overcome acoustic instability which arises from the removal of the isolation, which is inherent in the telephone handset, between the send and receive transducers.

There are two general approaches to overcoming the problem of acoustic feedback. The first is to switch off the channel which is not in control; thus breaking the feedback loop. However, the switching tends to be intrusive, a common fault being clipping or loss of syllables on switching. The second is to use adaptive echo cancellation. Such systems tend to be very complex and have stability problems associated with the degree to which the varying unwanted coupling signals can be modelled and cancelled.

A further suggestion which has been made is to include a frequency shifter in the loop between the microphone and loudspeaker as is known for public address systems and is said to enable an increase in usable gain of up to 10 dB to be obtained.

SUMMARY OF THE INVENTION

It is an object of the invention to enable the provision of an alternative loudspeaking telephone instrument.

The invention provides a loudspeaking telephone as set forth in the opening paragraph characterised in that a comb filter, having stop bands spaced at a multiple of the frequency by which the frequency shifter shifts that of a signal applied to its input, is connected in the loop between the microphone and the loudspeaker.

The inclusion of the comb filter reduces the effective loop gain of the loudspeaking telephone since as the signal passes round the loop the frequency shifter transfers it from the pass bands to the stop bands of the comb filter thus effectively breaking the loop.

A comb filter may be connected in both the transmit and receive paths. This provision is unnecessary when only loudspeaking telephones according to the invention are used in a system but in mixed systems, either using loudspeaking telephones without comb filters or telephone instruments with normal handsets, excessive sidetone may occur in the other instrument if the second comb filter is not provided.

While the maximum usable gain is achieved when the multiple is one, higher multiplies are possible if a lower overall loop gain is acceptable.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
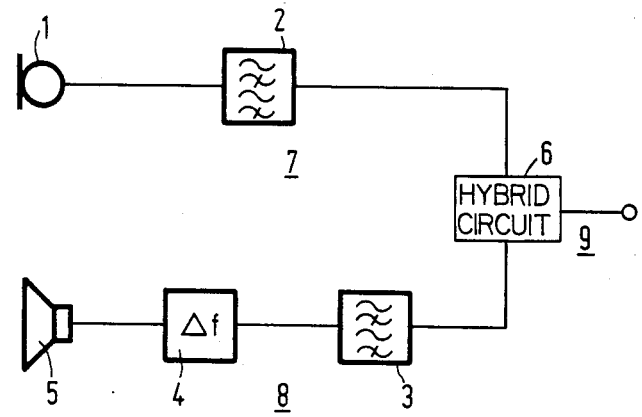
FIG. 1 shows in block schematic form a loudspeaking telephone according to the invention.

FIG. 1 shows in block schematic form an embodiment of a loudspeaking telephone according to the invention. As shown in FIG. 1 the loudspeaking telephone comprises a transmit path comprising a microphone 1 and a comb filter 2; a receive path comprising a comb filter 3, a frequency shifter 4, and a loudspeaker 5; and a hybrid circuit 6. The hybrid circuit 6 has a first port for connection to the transmit path 7, a second port for connection to the receive path 8, and a third port for connection to a subscriber's line via a path 9. The frequency shifter 4 shifts the frequency of the signals applied to the input by a given amount, for example 10 Hz. This frequency shift will increase the usable gain in the instrument before acoustic coupling between the microphone and loudspeaker causes howl. It has been suggested that an increase in usable gain of up to 10 db can be obtained by the use of a frequency shifter in public address systems. In order to increase the usable gain still further two comb filters 2 and 3 are included, one in the transmit path and one in the receive path. These comb filters have a series of stop bands spaced by a multiple of the amount by which the frequency shifter shifts the frequency of the frequency components of the original signal. For the most effective suppression of howl the multiple should be one but if the gain of the loop is such that the signal must traverse the loop more than once before instability sets in the multiple may be correspondingly increased.

For the arrangement shown in FIG. 1 if the full spectral signal produced by the microphone 1 is f the comb filter 2 passes the spectral signal components having a spectral function $f_1$ and rejects the spectral signal components having a spectral function $f_2 = f_1 + \Delta f$, where $\Delta f$ is the frequency shift produced by the frequency shifter 4. Thus the spectral function of the signal at the output of the comb filter 2 is $f_1$ and this spectral signal is mainly passed by the hybrid circuit 6 to the subscriber's line 9. Due to a less than perfect hybrid circuit a fraction of the signal $f_1$ will leak across the hybrid from the transmit path to the receive path. This fractional portion of the signal $f_1 (= f_1/R)$ will pass through the comb filter 2. It will subsequently be shifted in frequency by the frequency shifter 4 to form the spectral signal $(f_1 + \Delta f)/R$ which will be emitted by the loudspeaker 5. Any fractional portion of this signal which is acoustically picked up by the microphone 1 will be rejected by the comb filter 2 since the spectral components thereof will fall in the stop bands of the comb filter 2. Thus the loop is effectively broken allowing a further increase in the usable gain for the instrument.

Figure 2:
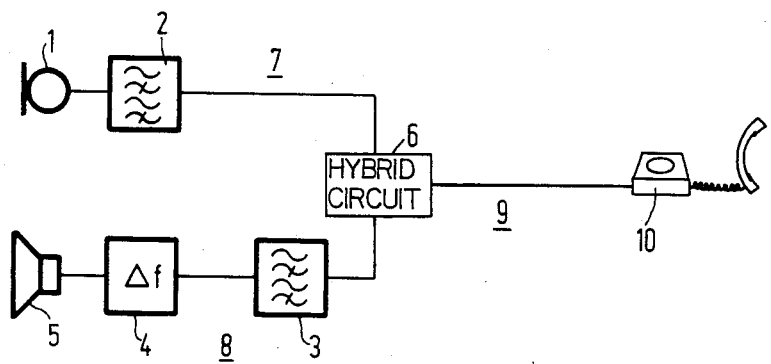
FIG. 2 shows the loudspeaking telephone of FIG. 1 connected to a telephone instrument with a normal handset.

FIG. 2 shows the loudspeaking telephone of FIG. 1 connected via a two wire transmission line 9 to a conventional telephone instrument 10. While there will be only a small level of acoustic coupling between the microphone and earpiece of the telephone instrument 10 there will be an electrical signal coupling between the transmit and receive paths of the loudspeaking telephone across the hybrid circuit 6 which, in practice, is not a perfect signal separation device. Thus when a two-wire full duplex transmission link is used it is advantageous to include the frequency shifter 4 and comb filters 2 and 3 to reduce the feedback round the loop formed by the loudspeaker 5, microphone 1, transmit path 7, hybrid 6, and receive path 8.

If the full spectral signal produced by the microphone in the handset of the telephone instrument and transmitted along the transmission path 9 to the hybrid circuit 6 is f, the comb filter 3 passes a signal having a spectral function $f_1$ and rejects a signal having a spectral function $f_2 = f_1 + \Delta f$. Thus the spectral function of the signal at the output of the comb filter 3 is $f_1$ and that at the output of the frequency shifter $f_1 + \Delta f$. This is converted to an acoustic signal by the loudspeaker 5 and will be coupled to the microphone 1. The microphone 1 re-converts the acoustic signal into an electrical signal having the spectral function $f_1 + \Delta f = f_2$. The comb filter 2 has an identical response to that of the comb filter 3 and hence the coupled signal $f_2$ is rejected by the comb filter 2 preventing it from being fed back to the earpiece of the handset of the telephone instrument 10 via the hybrid circuit 6 and transmission line 9 and causing an excessive sidetone level in the handset.

Figure 3:
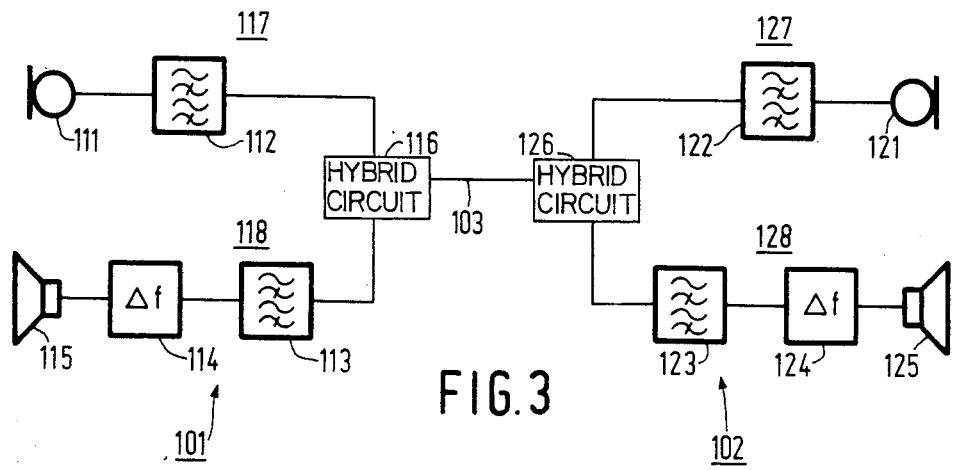
FIG. 3 shows two loudspeaking telephones as such in FIG. 1 connected to communicate with each other.

FIG. 3 shows a first loudspeaking telephone 101 which is connected to a second loudspeaking telephone 102 by a transmission path 103. The first loudspeaking telephone 101 comprises a microphone 111, a first comb filter 112, a second comb filter 113, a frequency shifter 114, a loudspeaker 115, and a hybrid circuit 116. The microphone 111 and first comb filter 112 form a transmit path 117 which is conected to a first port of the hybrid circuit 116. The comb filter 113, frequency shifter 114 and loudspeaker 115 form a receive path 118 which is connected to a second port of the hybrid circuit 116. The third port of the hybrid circuit 116 is connected to a transmission path 103. Similarly the second loudspeaking telephone 102 comprises a transmit path 127 comprising a microphone 121 and a comb filter 122 connected to the first port of a hybrid circuit 126 and a receive path 128 comprising a comb filter 123 connected to the second port of the hybrid circuit 126 and to a frequency shifter 124 which is in turn connected to a loudspeaker 125. The third port of the hybrid circuit 126 is connected to the transmission path 103.

If the comb filters 112, 113, 122 and 123 each have the same characteristics and the frequency shifts produced by the frequency shifters are identical then each loudspeaking telephone instrument will behave in the same way as that described with reference to FIG. 1 as far as its own originating signals are concerned. Speech signals from the microphone 111 having a spectral content f will be applied to the loudspeaker 125 with a spectral content $f_2$ as a result of passing through the comb filters 112 and 123 and the frequency shifter 124. Consequently any signal acoustically coupled between the loudspeaker 125 and microphone 121 wil be rejected by the comb filter 122. A similar effect will occur at comb filter 112 when the microphone 121 supplies a signal with a spectral content f to loudspeaker 115.

It should be noted that there is no necessity for a two wire transmission between the loudspeaking telephones 101 and 102. If a four wire circuit is available this can be used, the hybrid circuits 116 and 126 being then unnecessary. The same, of course, applies to the communication between a loudspeaking telephone and a normal telephone instrument.

Various other modifications could be made to the embodiments shown without departing from the scope of the invention. For example, one of the comb filters could be omitted. This would have no effect on the operation of a system in which only loudspeaking telephones as described in FIG. 1 are used but in a mixed system such as that shown in FIG. 2 will cause an increased sidetone level to be perceived by the handset user. Depending on the degree of acoustic coupling between the microphone and loudspeaker this may reach unacceptable levels. The frequency shifter may be provided in the transmit path rather than the receive path provided that it is placed to operate on the signal at the output of the comb filter.

The frequency shifter 4 may take any convenient form, for example as described in an article by M. Hartley Jones entitled Frequency Shifter for "Howl" Suppression published in Wireless World, July 1973, at pages 317 to 322, the contents of which are hereby incorporated by reference.

The comb filters may, for example, be of the type in which a delayed version of the signal is added to the undelayed signal or a bank of switched capacitor filters implemented as an LS1 integrated circuit.

We claim:

1. An improved loudspeaking telephone instrument comprising a transmit path having an input including a microphone and an output to which speech signals are transmitted by such microphone, a receive path having an output including a loudspeaker and an input for receiving speech signals for transmission to such loudspeaker, and means for electrically coupling the output of the transmit path and the input of the receive path to a telephone line; such electrical coupling means also transmitting a fractional proportion of speech signals at the output of the transmit path to the input of the receive path; the loudspeaker and the microphone being acoustically coupled so that speech signals at the output of the transmit path and transmitted through the receive path are fed back to the input of the transmit path in a regenerative feedback loop; such improvement consisting of circuit means for limiting such regenerative feedback of speech signals produced at the output of the transmit path, such circuit means comprising:

a frequency shifter connected in series in one of the transmit and receive paths and producing a predetermined frequency shift of substantially all of the spectral frequency components of a speech signal transmitted through such one path originating from said microphone; and a first comb filter connected in series in the other of the transmit and receive paths, such filter having successive frequency stop-bands spaced by successive frequency pass-bands, such spacing being an integral multiple M of the predetermined frequency shift produced by said frequency shifter; said filter blocking those spectral frequency components of a speech signal at the input of such other path which are in the stop-bands of said filter from reaching the output of such other path;

whereby the spectral frequency components of a speech signal which has been fed back through said feedback loop M times by the acoustic coupling between said loudspeaker and said microphone are shifted into the frequency stop-bands of said first comb filter and are thereby blocked from again being fed back through said loop by said acoustic coupling.

2. A loudspeaking telephone instrument as claimed in claim 1, characterized in that said first comb filter is provided in the transmit path and a second comb filter having the same pass-bands and stop bands as the first comb filter is provided in the receive path.

3. A loudspeaking telephone instrument as claimed in claim 1, characterised in that the frequency shifter is provided in the receive path.

4. A loudspeaking telephone instrument as claimed in claim 1 in which the value of M is one.

* * * * *